(12) United States Patent
Colom et al.

(10) Patent No.: US 9,015,805 B2
(45) Date of Patent: Apr. 21, 2015

(54) TERMINAL ACTIVATION METHOD

(75) Inventors: Francois Colom, Paris (FR); Patrick Lambert, Paris (FR)

(73) Assignee: Ingenico France, Neuilly sur Seine (FR)

( * ) Notice: Subject to any disclaimer, the term of this patent is extended or adjusted under 35 U.S.C. 154(b) by 1587 days.

(21) Appl. No.: 12/315,199

(22) Filed: Nov. 7, 2008

(65) Prior Publication Data

US 2009/0165094 A1   Jun. 25, 2009

(30) Foreign Application Priority Data

May 11, 2006   (FR) ..................................... 06 04195

(51) Int. Cl.
*G06F 7/04* (2006.01)
*G06F 15/16* (2006.01)
*H04L 9/08* (2006.01)
*H04L 9/32* (2006.01)
*H04L 29/06* (2006.01)

(52) U.S. Cl.
CPC .............. *H04L 9/0897* (2013.01); *H04L 9/321* (2013.01); *H04L 9/3226* (2013.01); *H04L 63/0428* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 5,018,096 | A * | 5/1991 | Aoyama ........................ | 711/164 |
| 5,586,185 | A * | 12/1996 | Shibata et al. ................ | 380/264 |
| 5,878,337 | A * | 3/1999 | Joao et al. ..................... | 455/406 |
| 6,829,596 | B1 * | 12/2004 | Frazee ............................ | 705/66 |
| 6,992,563 | B1 | 1/2006 | Plumeier | |
| 7,239,634 | B1 * | 7/2007 | Chakravorty ................. | 370/392 |
| 2002/0025797 | A1 * | 2/2002 | Joao et al. ..................... | 455/406 |
| 2003/0133572 | A1 * | 7/2003 | Fish et al. ..................... | 380/232 |
| 2003/0235810 | A1 * | 12/2003 | Ide et al. ....................... | 434/350 |

FOREIGN PATENT DOCUMENTS

| | | |
|---|---|---|
| EP | 1 422 864 A1 | 5/2004 |
| EP | 1 534 043 A2 | 5/2005 |

OTHER PUBLICATIONS

XP-002429331A, Section 10.3, Challenge-response identification (strong authentication), pp. 397-399, Applied Cryptography Menezes et al. 1996.
XP-002429331A, Chapter 12 Key Establishment Protocols, Secret sharing, pp. 524-527, Applied Cryptography, Menezes et al. 1996.
XP-002429331A, Section 13.3 Techniques for distributing confidential keys, pp. 551-553, Applied Cryptography, Menezes et al. 1996.

\* cited by examiner

*Primary Examiner* — Kaveh Abrishamkar
(74) *Attorney, Agent, or Firm* — Blakely Sokoloff Taylor & Zafman

(57) ABSTRACT

The invention relates to a method for activating a terminal (4) by an operator, the activation of the terminal allowing secured exchanges of information between the terminal (4) and a secured server, characterized in that it comprises the following steps for the terminal (4):
  receiving from the operator (2) a first piece of activation information,
  receiving from an authorization server (3) a second piece of activation information,
  using the first and second pieces of activation information for activating the terminal.

8 Claims, 2 Drawing Sheets

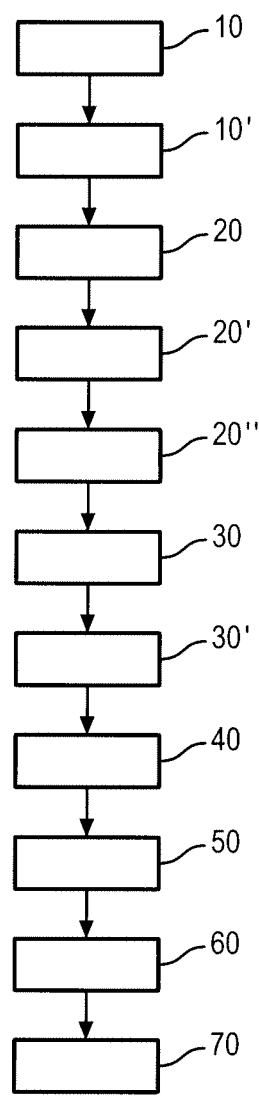

TERMINAL ACTIVATION METHOD

Figure 1:
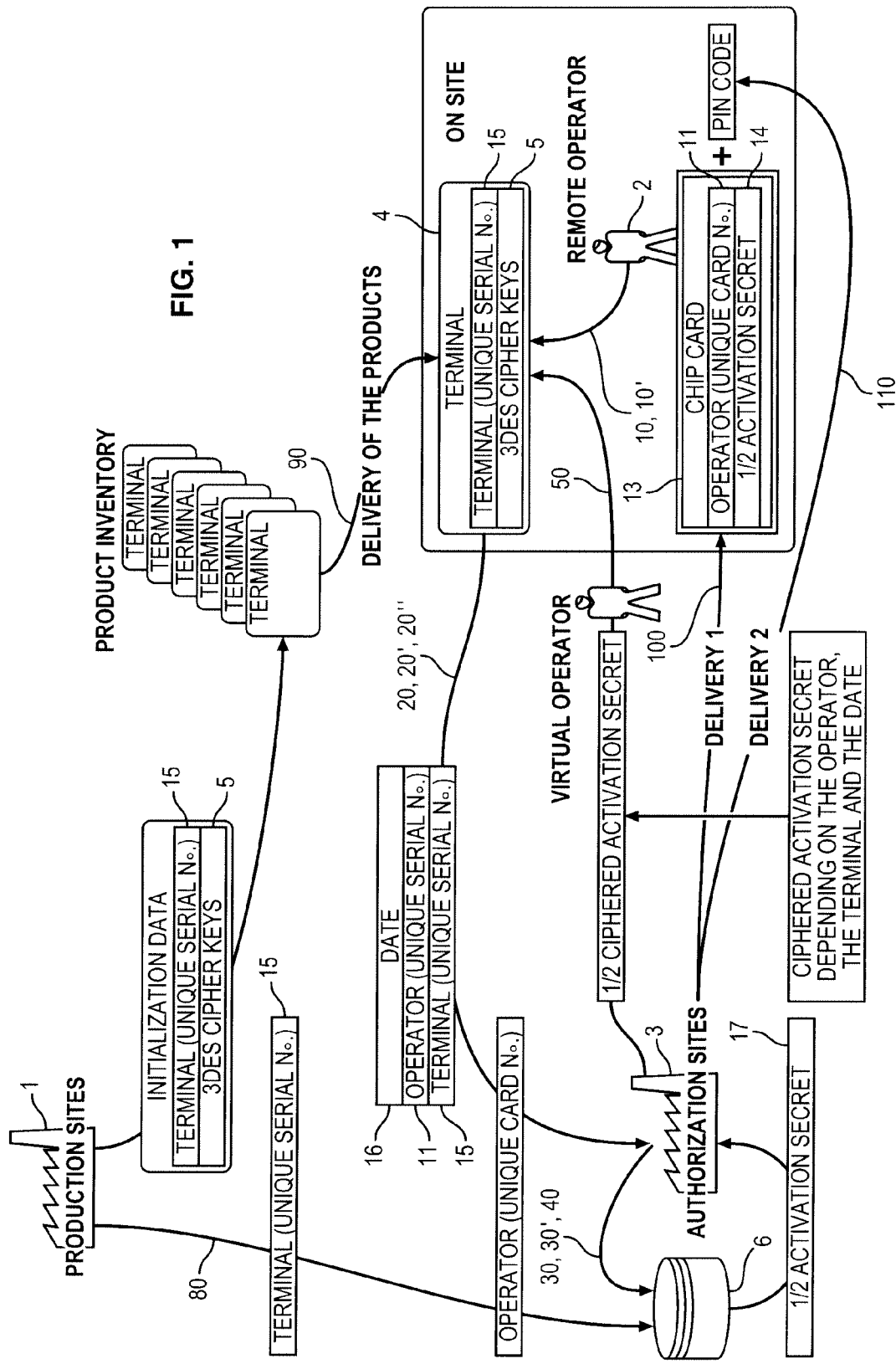

The present patent application is a Utility claiming the benefit of Application No. PCT/EP2007/054410, filed May 7, 2007.

The present invention relates to the general technical field of service security, and more particularly to the technical field of activation of a secured terminal for the input of confidential data.

It is notably suitable for electronic payment terminals and bank note distributors.

GENERAL PRESENTATION OF THE PRIOR ART

When placing a secured terminal, or after a maintenance operation on a secured terminal (which implies deactivation of the terminal), the integrity of the terminal has to be checked before activation or reactivation of the terminal.

In order to guarantee the security of the terminal, its activation should be carried out by two distinct operators according to the directives of the PCI standard for PEDs. This dual activation has the drawback of requiring the presence of two operators on the site where the terminal is found.

The general object of the invention is to propose a method and associated means allowing dual activation of the terminal only requiring one operator on the site where the terminal is found.

PRESENTATION OF THE INVENTION

For this purpose, a method for activating a terminal by an operator is provided, the activation of the terminal allowing exchange of secured information between the terminal and a secured server, characterized in that it comprises the following steps for the terminal:
  receiving from the operator a first piece of activation information,
  receiving from an authorization server a second piece of activation information,
  using the first and second pieces of activation information for activating the terminal.

Thus, the activation of the terminal requires reception of two pieces of activation information received from two distinct entities: the first and the second pieces of activation information are complementary and together allow activation of the terminal. In other words, reception of only one of the two pieces of activation information does not allow activation of the terminal: it is further required that the terminal receives the other of the two pieces of activation information.

Within the scope of the present invention, by <<activating a terminal>> is meant the fact of making this terminal operational.

The secured server is for example a bank server and the terminal a payment terminal.

The method according to the invention allows dual activation of the terminal only requiring the presence of one physical person on the site where the terminal to be activated is found, the remote authorization server plays the role of a virtual operator.

Preferred but non-limiting aspects of the activation method according to the invention are the following:
  the first and second pieces of activation information are ciphered, the method comprising the following steps for the terminal:
    deciphering the first and second ciphered pieces of activation information by using at least one cipher key assigned to the terminal and stored in the memory of the terminal, With this, it is possible to prevent activation information exchanged between the terminal, the operator and the authorization server from being able to be reused by a malevolent third party.

the method further comprises the following steps:
  for the terminal:
    sending to the authorization server, an operator identifier assigned to the operator and a terminal identifier assigned to the terminal,
  for the authorization server:
    verifying, depending on the operator and terminal identifiers received from the terminal, that the operator is authorized to activate the terminal and that the activation of the terminal is authorized, the second piece of activation information being sent to the terminal if the operator is authorized to activate the terminal and if activation of the terminal is authorized,
the method further comprises the following steps:
  for the authorization server:
    searching in a database for the plurality of cipher keys assigned to the terminal,
    creating the second piece of activation information depending on activation information in the database,
    ciphering the second piece of activation information by using the cipher key assigned to the terminal,
    sending the second ciphered piece of activation information to the terminal,
  for the terminal:
    deciphering the second ciphered piece of cipher information by using the cipher key assigned to the terminal and stored in the memory of the terminal,
the method further comprises the following step for the terminal:
  sending to the authorization server a date used as a random variable during the step for ciphering the second piece of activation information,
the method further comprising the following step for the authorization server:
  writing into the database the terminal identifier, the operator identifier and the moment of intervention on the terminal.
the operator identifier comprises a single operator number stored on an activation means comprising the first piece of activation information,
the operator identifier further comprises a personal identification number intended to be entered on the terminal, the personal identification number being associated with the operator number,
the method comprising a step consisting of checking whether the number entered by the operator on the terminal is equal to the personal identification number associated with the operator number.

The invention also relates to a server capable of applying the method described above The invention also relates to a terminal capable of applying the method described above.

PRESENTATION OF FIGURES

Other characteristics, objects and advantages of the present invention will further become apparent from the following description, which is purely illustrative and non-limiting and should be read with reference to the appended drawings wherein:

FIG. 1 shows the different exchanges between means with which the method may be applied, FIG. 2 schematizes the steps applied in one embodiment of the method.

DESCRIPTION OF THE INVENTION

With reference to FIGS. 1 and 2, means for applying an embodiment of the method according to the invention and the steps of an embodiment of the method according to the invention are illustrated.

These means comprise a production site 1, an operator 2, an authorization server 3, and at least one terminal 4.

The production site 1 is en entity which produces terminals. The production site 1 is also responsible for delivering produced terminals to the site for which these terminals are intended.

The operator 2 is a physical person authorized to intervene on the terminals. The operator 2 moves to the sites where the terminals have been delivered in order to verify the integrity of these terminals. The operator 2 is one of the two protagonists required for dual activation of the terminal 4.

The authorization server 3 is an entity responsible for authorizing the operators 2. The authorization server 3 sends to the operator 2 means with which the operator 2 may be identified and means required for activating the terminal 4. The authorization server 3 is also responsible for verifying the information received from the terminal 4 to be activated. The authorization server 3 is the other of the two protagonists required for dual activation of the terminal 4.

The terminal 4 is a secured peripheral comprising one or more cipher keys 5 which are stored in a memory of the terminal 4, and which allow ciphering of a piece of information to be transmitted, or deciphering of a ciphered piece of information received by the terminal. The terminal is intended to exchange with a secured server (not shown) once it is activated, i.e. once the terminal is ready to receive the secrets shared with the secured servers. The terminal is for example a payment terminal and the secured server a bank server.

The terminal activation method comprises the following steps.

For activating a terminal 4, an authorized operator 2 goes to the site where the terminal 4 is found (or the terminal is brought back to a site where the operator 2 is found).

After verification of the integrity of the terminal 4 by the authorized operator 2, the activation method is applied.

In a step 10 of the method for activating the terminal 4, the operator 2 is identified at the terminal 4. For this, he/she sends to the terminal 4 a personal operator identifier which has been provided to him/her by the authorization server 3.

The operator identifier is specific to each operator 2: in other words, two distinct operators 2 cannot have the same operator identifier. This allows the authorized operators 2 to be distinguished from each other, and the operator 2 who intervenes on the terminal 4, to be identified among the whole of the authorized operators 2.

In one embodiment, the operator identifier comprises a single personal operator number 11 stored on a means for activating the terminal 4. The means for activating the terminal 4 is for example a chip card 13 intended to be inserted into the terminal 4.

This operator number 11 stored in the chip card 13 may be associated with a personal identification number 12 (PIN code) which the operator 2 has to enter on a keyboard (not shown) of the terminal 4.

The fact that identification of the operator 2 requires insertion of the chip card 13 and entry of a personal identification number 12 on the terminal 4, limits the risk that a third party may substitute himself/herself for the authorized operator 2 in the case of loss or theft of the chip card 13. Any loss or theft of chip card 13 is declared to the authorization site 3 so as to apply for an opposition on the chip card 13 on the authorization server 3.

In the case when the operator identifier comprises an operator number 11 stored on the chip card 13 and a personal identification number 12 to be entered on the keyboard of the terminal 4, the terminal 4 checks that both portions of the operator identifier actually match each other.

In the case when the operator 2 enters erroneous personal identification numbers three times in a row (i.e. if the code entered on the keyboard of the terminal is different from the PIN code associated with the chip card), a function for blocking the chip card 13 of the operator 2 may for example be activated.

In another step 10' of the activation method, the operator 2 sends to the terminal 4 a first piece of activation information 14. Optionally, the first piece of activation information 14 is ciphered by using the cipher key(s) assigned and stored in the memory of the terminal 4. The terminal stores in a memory the first piece of activation information.

The sending to the terminal 4 of the operator identifier and of the first piece of activation information 14 may be carried out simultaneously or sequentially.

In one embodiment, the first piece of activation information 14 is recorded on the chip card 13 of the operator 2.

In another step 20 of the method, the terminal 4 sends to the authorization server 3 the operator identifier (and more particularly the operator number 11 stored on the chip card 13) to the authorization server 3.

The terminal 4 also sends 20' to the authorization server 3 a terminal identifier 15 which is associated with it, and which is stored in a memory of the terminal 4.

The terminal identifier 15 is specific to each terminal 4: in other words, two distinct terminals 4 cannot have the same terminal identifier. This allows the terminals 4 to be distinguished from each other.

In one embodiment, the terminal identifier 15 comprises a single serial number.

In one embodiment, the terminal 4 also sends 20" to the authorization server 3 a date 16 which for example comprises the year, the month, the day and the time corresponding to the moment of intervention of the operator 2 on the terminal 4.

The sendings 20, 20', 20" of the operator identifier, of the terminal identifier and of the date may be carried out simultaneously or sequentially.

In another step of the method, the authorization server 3 receives the operator identifier, the terminal identifier and the date, and checks these pieces of information.

The authorization server 3 checks 30 that the operator 2 is authorized to intervene on the terminal 4. For this, the authorization server 3 refers to a database 6 in which information relating to the authorization of the operator 2 is stored.

The authorization server 3 also verifies 30' that the terminal 4 is authorized to be activated, i.e. that the terminal 4 has not been removed from the number of utilizable terminals because it has been stolen or has become unfit for use, too old or obsolete. The information relating to the usability of a terminal is stored in the database 6 of the authorization server 3.

In one embodiment, the authorization server 3 stores 40 in the database 6 information relating to the current intervention. For example, the authorization server 3 stores in the database 6 the date 16 sent by the terminal 4, the terminal identifier and the operator identifier 2. This provides traceability of the operations carried out on the terminal 4.

The authorization server 3 also creates a second piece of activation information 17 associated with the terminal depending on the data stored in the database 6.

If the operator 2 is authorized to activate the terminal 4, and if the terminal 4 is utilizable, the authorization server 3 sends 50 to the terminal 4 the second piece of activation information 17.

Optionally, the authorization server 3 may cipher the second piece of activation information 17, for example by using the cipher key(s) assigned to the terminal, which may be stored beforehand in the database 6. The cipher of the second piece of activation information 17 by using the cipher key(s) assigned to the terminal may depend:

on the operator identifier,
on the terminal identifier,
on the date.

The date is used as a random variable during ciphering.

In another step of the method, the terminal 4 receives the second piece of activation information.

In the case when the first and second pieces of activation information are ciphered, the terminal 4 deciphers 60 the first and second ciphered pieces of activation information by using the cipher key(s) assigned to the terminal.*

In order to decipher the second piece of activation information, the terminal uses the date, the operator identifier and the terminal identifier, as well as the cipher key(s) assigned to the terminal and stored in the memory of the terminal. Indeed, the date, the operator and terminal identifiers are known to the terminal 4 which has transmitted them to the authorization server 3.

Once the second piece of activation information 17 is received (and the first and second pieces of activation information are deciphered), the terminal 4 is ready to receive the secrets shared with the secured servers: the terminal 4 is activated.

Thus, the method according to the invention provides dual activation of the terminal 4, this dual activation only requiring one operator 2 on the site where the terminal 4 is found.

Prior to applying the activation method, two methods are applied:

a method for creating the terminal,
an operator authorization method.

As an indication, examples of terminal creation and operator authorization methods will now be described with reference to FIG. 2, these methods being given purely as an indication.

The terminal creation method comprises the following steps:

In one step of the method for creating terminals, the production site 1 produces a terminal 4 and associates it with a terminal identifier 15. The terminal identifier 15 is stored in a terminal memory 4.

In another step of the method for creating terminals, the production site 1 receives from the authorization server 3 a set of cipher keys which have been generated by the authorization server 3.

The cipher keys are for example 3DES cipher keys. Of course, the method according to the invention is not limited to this example of 3DES cipher keys, the cipher keys may be RSA keys or any other type of keys known to one skilled in the art, the selection of the type of keys depending of the cipher algorithm used.

In another step of the method for creating the terminal, the production site 1 selects one or more cipher keys which it assigns to the created terminal 4 from the whole of the cipher keys received from the authorization server 3.

In another step of the method for creating the terminal, the production site 1 stores in a secured memory of the terminal 4, the cipher key(s) 5 selected for the terminal 4.

In another step 80 of the method for creating the terminal, the production site 1 sends to the authorization server 3 the identifier of the terminal 15. The production site 1 also sends the cipher key(s) 5 assigned to the terminal 4.

In another step of the method for creating the terminal, the authorization server 3 receives the cipher key(s) assigned to the terminal 4 as well as the identifier of the terminal.

The authorization server 3 stores in the database 6 the identifier of the terminal 15 and the cipher key(s) 5 assigned to the terminal 4, so that the authorization server 3 is capable of retrieving the cipher key(s) 5 assigned to the terminal 4 depending on the identifier of the terminal 15.

Moreover, the fact that the cipher key(s) 5 are recorded in the terminal 4 and in the authorization server 3 allows ciphered exchanges between the terminal 4 and the authorization server 3, in particular upon transferring the second piece of activation information 17.

In another step 90 of the method for creating the terminal, the production site 1 delivers the terminals onto the sites to which these terminals are dedicated.

The terminals may then be activated by applying the activation method described earlier.

The method for authorizing an operator 2 comprises the following steps.

In one step of the authorization method, the authorization server 3 sends to the operator 2 an operator identifier allowing him/her to be identified at the terminal 4 to be activated.

As described earlier, this identifier may comprise:

an operator number stored on a chip card intended to be inserted into the terminal 4 by the operator 2 in one step of the activation method described above,
a personal identification number associated with the operator number and which the operator 2 has to enter on the terminal 4.

The sending of the chip card on which the operator number and the associated personal identification number are stored may be performed in two phases:

the chip card being sent to the operator 2 in a first delivery 100,
the personal identification number being sent to the operator 2 in a second delivery 110.

With this, it is possible to limit the risk that a third party intercepting one of the deliveries 100, 110 be in possession of the whole of the information allowing an authorized operator 2 to be identified. Thus, the risk that a third party may substitute himself/herself for an authorized operator 2 is limited.

The reader will appreciate that the division of the global message allowing activation of the terminal into:

the first piece of activation information, and
the second piece of activation information may be performed by the authorization server which only stores in the database the second piece of activation information, the first piece of activation information being stored on the chip card of the operator (after ciphering the latter by means of the cipher key(s) assigned to the terminal in the embodiments or such a ciphering of the first piece of activation information is carried out).

The different embodiments of the method according to the invention therefore have many advantages:

the operators 2 intervening on the terminals may be identified since a single personal identifier is assigned to them.
an operator 2 cannot alone activate a terminal since this activation requires reception by the terminal 4 of two pieces of activation information, the operator 2 only being in possession of only one of these two pieces of information, the loss of the activation means of the operator 2 (i.e. for example the chip card) does not allow a third party to substitute himself/herself for the authorized operator 2 when the identification of the operator 2 requires the entry of a personal identification number on the terminal 4, the interventions carried on a terminal 4 may be traced in the embodiments where the authorization server 3 records in the database the operator identifier, the terminal identifier and the date corresponding to the moment of intervention, the recording of the interventions carried out on a terminal 4 is centralized on the database of the authorization server 3, which facilitates the tracking of the interventions carried out on the whole of the terminals, and also facilitates a posteriori monitoring of possible missteps of the operator 2, by ciphering the first and second pieces of activation information, it is possible to avoid this information from being able to be intercepted by a third party and reused for fraudulently activating the terminal or other terminals.

REFERENCES

10 identification of the operator at the terminal
10' sending, by the operator, of a first piece of activation information to the terminal
20 sending, by the terminal, of the operator identifier to an authorization server
20' sending, by the terminal, of a terminal identifier to the authorization server
20" sending, by the terminal, of a date to the authorization server
30 verification, by the authorization server, of the authorization of the operator
30' verification, by the authorization server of the usability of the terminal
40 storing, by the authorization server, of information relating to the current intervention
50 ciphering, by the authorization server, of a second piece of activation information
60 sending, by the authorization server, of the second piece of activation information
70 deciphering, by the terminal, of the second ciphered piece of activation information

The invention claimed is:

1. A method for activating a payment terminal by an operator, the activation of the payment terminal allowing exchanges of secured information between the payment terminal and a secured server, comprising:
   the payment terminal receiving from the operator a first ciphered piece of activation information after checking the integrity of the payment terminal by the operator,
   the payment terminal deciphering the first ciphered piece of activation information by using at least one cipher key assigned to the payment terminal and stored in a memory of the payment terminal,
   after said first ciphered piece of information has been successfully deciphered, the payment terminal receiving from an authorization server a second ciphered piece of activation information,
   the payment terminal deciphering the second ciphered piece of activation information by using the at least one cipher key,
   the payment terminal using the first and second pieces of activation information for activating the payment terminal, said first piece of activation information received from said operator and said second piece of activation information received from said authorization server, being complementary and in combination making the terminal operational.

2. The method according claim 1, wherein the method further comprises the following steps:
   for the payment terminal:
   sending to the authorization server, an operator identifier assigned to the operator and a terminal identifier assigned to the payment terminal, for the authorization server:
   checking, depending on the operator and terminal identifiers received from the payment terminal, that the operator is authorized to activate the payment terminal and that the activation of the payment terminal is authorized.

3. The method according to claim 1 or claim 2, wherein the method further comprises the following steps:
   for the authorization server:
   searching in a database, for the cipher key assigned to the payment terminal, creating the second piece of activation information depending on information contained in the database, ciphering the second piece of activation information by using the cipher key assigned to the payment terminal, sending the second ciphered piece of activation information to the payment terminal.

4. The method according to claim 3, wherein the method further comprises the following steps:
   for the payment terminal:
   sending to the authorization server a date used as a random variable during the step for ciphering the second piece of activation information.

5. The method according to claim 1, wherein the method further comprises the following step for the authorization server:
   writing into a database, the terminal identifier, the operator identifier and a moment of intervention on the payment terminal.

6. The method according to claim 1, wherein the operator identifier comprises a single operator number comprising the first piece of activation information.

7. The method according to claim 6, wherein the operator identifier further comprises a personal identification number intended to be entered on the payment terminal, the personal identification number being associated with the operator number, the method comprising a step of checking whether the number entered by the operator on the payment terminal is equal to the personal identification number associated with the operator number.

8. A terminal, comprising:
   means for receiving from the operator a first ciphered piece of activation information after checking the integrity of the payment terminal by the operator,
   means for receiving from an authorization server a second ciphered piece of activation information,
   means for deciphering the first ciphered piece of activation information by using at least one cipher key assigned to the terminal and stored in a memory of the payment terminal, and after successfully deciphering the first ciphered piece of activation information, deciphering the second ciphered piece of activation information by using the at least one cipher key, means for using the first and second pieces of activation information for activating the payment terminal, said first piece of activation information received from said operator and said second piece of activation information received from said authorization server, being complementary and in combination making the terminal operational.

\* \* \* \* \*

UNITED STATES PATENT AND TRADEMARK OFFICE
CERTIFICATE OF CORRECTION

| | | |
|---|---|---|
| PATENT NO. | : 9,015,805 B2 | Page 1 of 1 |
| APPLICATION NO. | : 12/315199 | |
| DATED | : April 21, 2015 | |
| INVENTOR(S) | : Francois Colom and Patrick Lambert | |

It is certified that error appears in the above-identified patent and that said Letters Patent is hereby corrected as shown below:

On the Title Page, in Item [22] PCT Filed: please insert --May 7, 2007-- and under Item [86] PCT No.: please insert --PCT/EP2007/054410--.

Signed and Sealed this
Fifteenth Day of December, 2015

Michelle K. Lee
*Director of the United States Patent and Trademark Office*